United States Patent [19]

Kawasaki et al.

[11] Patent Number: 5,480,557
[45] Date of Patent: Jan. 2, 1996

[54] METHOD FOR PREVENTING ADHESION OF SCALES IN SERVICE WATER OR CIRCULATING INDUSTRIAL WATER BY APPLYING THE MAGNETIC FIELD

[75] Inventors: Miyoji Kawasaki, Sano; Masanori Hirose, Shimodate; Toshitsugu Suzuki, Ashikaga; Tei Matsuura, Sano; Yoshinada Yokoyama, Kawachi, Japan

[73] Assignee: Heisei Riken Kabushiki Kaisha, Tochigi, Japan

[21] Appl. No.: 273,606

[22] Filed: Jul. 12, 1994

Related U.S. Application Data

[63] Continuation-in-part of Ser. No. 249,072, May 25, 1994, abandoned, which is a continuation-in-part of Ser. No. 57,841, May 7, 1993, abandoned.

[30] Foreign Application Priority Data

May 8, 1992 [JP] Japan ................................. 4-143391

[51] Int. Cl.⁶ ........................................... C02F 1/48
[52] U.S. Cl. ............................. 210/695; 210/222
[58] Field of Search ....................... 210/222, 223, 210/695; 422/186.02

[56] References Cited

U.S. PATENT DOCUMENTS 5,055,189  10/1991  Ito ........................................... 210/222
5,149,438   9/1992  Hebert ..................................... 210/695

FOREIGN PATENT DOCUMENTS 52-112115  9/1977  Japan.
58-108156  7/1983  Japan.
61-118187  6/1986  Japan.

Primary Examiner—Matthew O. Savage
Attorney, Agent, or Firm—Wenderoth, Lind & Ponack

[57] ABSTRACT

An effective method of preventing adhesion of scales in service water or circulating industrial water containing calcium carbonate and silicic acid. The treated water is circulated at a flow velocity of more than 0.5 m/sec. through a pipe, and a magnetic field having a magnetic flux density of, for example, 13500 Gs. is applied to the circulating water.

3 Claims, No Drawings

METHOD FOR PREVENTING ADHESION OF SCALES IN SERVICE WATER OR CIRCULATING INDUSTRIAL WATER BY APPLYING THE MAGNETIC FIELD

This application is a continuation-in-part of now abandoned application, Ser. No. 08/249,072, filed May 25, 1994, which is a continuation-in-part of now abandoned application Ser. No. 08/057,841, filed May 7, 1993.

BACKGROUND OF THE INVENTION

1. Field of the Invention

This invention relates to a method of preventing adhesion of scales in city water or in circulating water at some portion or around an inner periphery of a water pipe, and more particularly to a method of preventing adhesion of scales in city water or in circulating water such as in a cooling system, a boiler or a heat exchanger at some portion or around an inner periphery of a water pipe, whereby maintenance is eased, circulating water can be maintained normally with a minimum flow in a water pipe and service water can be effectively used.

2. Description of the Prior Art

It has been reported that when industrial water in a device such as a cooling system is passed through a magnetic field, scales are prevented from being produced in the industrial water as shown in the published specifications (not examined) of the Japanese Patent Publication No. 112115/1977, 118187/86 and the Utility Model Publication No. 108156/1983.

More particularly, it is described in the specification of the Japanese Patent Publication No. 112115/1977 that the magnetic field is applied by a permanent magnet into a circulating liquid, oil or liquefied gas in a pipe in order to prevent production of scale or sludge.

It is also mentioned in the specification of the Japanese Patent Publication No. 118187/86 that a device for magnetically treating a material is used to prevent adhesion of mineral such as calcium, silica or magnesium onto an inner periphery of a pipe.

A device for magnetically treating a liquid in a pipe is also described in the specification of the Japanese Utility Model Publication No. 108156/1983.

It is described in the foregoing specifications that undissoluble impurities in water are ionized by a permanent magnet or an electromagnet to promote dissolution of the impurities so that an effect of preventing scales from being produced in water is proportional to a strength of the magnetic field.

In addition, according to Japanese standard for cooling water of air conditioning and refrigerating equipment, it has been reported that scale adhesion is mainly caused in a solution having a calcium carbonate content (hardness) over 200 ppm and a silicic acid content over 50 ppm. But a process for treating the solution containing comparatively undissoluble substance has not been found.

3. Disadvantages of the Prior Art

According to the conventional device having a magnetic treatment equipment, however, in which water is passed through the magnetic field, the strength of the magnetic field is restricted by the diameter of piping for mounting the magnet. In addition, the device for circulating water around the magnet is very complicated, and the circulating speed of water cannot be increased so that an effective magnetic treatment of water is difficult.

In consequence, it is preferable to provide an electro-magnet having a magnetic flux density of more than 8000 Gs., but it is very difficult to make such an electro-magnet having such a high magnetic flux density, thus making it impossible to use it as an industrial product practically.

The electro-magnet having less than 8000 Gs. has been experimentally made, but such an electro-magnet has not been found to have the suitable magnetic flux density for preventing generation of scales in water and its magnetic field dependency in accordance with the kind of ions has not been confirmed.

The present inventors have been working on the subject for many years, and have discovered that a compact electro-magnet having a strong magnetic flux density of more than 8000 Gs. has an extraordinary effect of preventing adhesion of scales, depending upon the kind of ions.

As indicated above, according to Japanese standard for cooling water of air conditioning and refrigerating equipment, adhesion of scales highly occurs in a solution containing a calcium carbonate content (hardness) over 200 ppm and a silicic acid content over 50 ppm. The method of this invention is very effective for treating such a solution containing such substances which cause adhesion of scales.

SUMMARY OF THE INVENTION

A principal object of this invention is to provide a method of preventing adhesion of scales in city water or in circulating industrial water (e.g. containing more than 200 ppm of calcium carbonate and more than 50 ppm of silicic acid) such as in a cooling system, a boiler or a heat exchanger at some portion or around an inner periphery of a water pipe, by applying a magnetic field to the water, whereby maintenance is eased, a circulating water can be maintained normally with a minimum current in a circulating water pipe and service water can be effectively used. The magnetic field has a magnetic flux density between 12000–15000 Gs.

Another object of this invention is to provide a method of preventing adhesion of scales in city water or in circulating industrial water such as in a cooling system, a boiler or a heat exchanger at some portion or around an inner periphery of a water pipe, which comprises a step of providing a circulatory pipe at a desired circulating water device, a step of passing a circulating water current through the circulatory pipe at a speed of more than 0.5 m/sec. and a step of applying a magnetic field having a magnetic flux density between 12000–15000 Gs. to the circulating water current. Another object of this invention is to provide a method of preventing adhesion of scales in city water or in circulating industrial water such as in a cooling system, a boiler or a heat exchanger at some portion or around an inner periphery of a water pipe, which is characterized in that water is circulated through a gap between the magnetic poles of an electro-magnet having a high magnetic flux density, the gap being more than 1.5 times wider than a cross sectional area of an inner core and of a top portion of the magnetic pole so as to prevent deflection of the magnetic flux generating from the inner pole into the magnetic poles, and an angle between the top magnetic poles of the inner pole and the outer pole is restricted to 54±50 to obtain the maximum flux density concentrated at the restricted angle to guide a magnetic path into the main magnetic field, thus preventing a saturated condition of the magnetic flux at the top portions of the magnetic poles.

DETAILED DESCRIPTION OF THE INVENTION

In order to study solubility of calcium carbonate, which is the main component of scales, in water, and also magnetic field dependency, calcium hydroxide was dissolved in water and reacted with carbon dioxide to obtain an aqueous solution of carbon hydrogencarbonate.

Similarly, in order to study solubility of silicic acid and its magnetic field dependency, sodium silicate was dissolved in demineralized water.

The aqueous solution thus obtained was magnetically treated while being circulated through a device having an electro-magnet at a speed of 10 liter/min. and also with the magnetic flux density being changed, and the adhesion of scale was measured.

As the result and as shown in TABLE 1, a weight of scale of calcium carbonate was maximum around 5000 Gs.

Afterwards, it has been discovered that the higher the magnetic flux density, the lower the weight of scale of calcium carbonate, and it has been found that the scale has decreased ⅓ of the maximum amount of scale around 1200 Gs.

On the other hand, it has been found that with a higher magnetic flux density of an example added with silicic acid, the weight of the adhered scale decreased, and the minimum amount of the adhered scale occurred around 5000 Gs. of the magnetic flux density, but subsequently the adhered scale increased.

As a result, it has been proved that the weight of the adhered scale does not necessarily decrease with the increased magnetic flux density, but there exists a suitable magnetic flux density with the components contained in water.

TABLE 1

Relationship between the weight of the adhered scales containing the various components and the magnetic flux density

| magnetic flux density (Gs) | 5000 | 8000 | 10000 | 11000 | 12000 | 13000 | 13500 | 14000 | 15000 |
|---|---|---|---|---|---|---|---|---|---|
| calcium carbonate (mg) | 16.0 | 13.0 | 10.0 | 8.0 | 5.7 | 3.2 | 2.4 | 1.8 | 0.3 |
| silicic acid | 2.0 | 2.3 | 3.2 | 4.1 | 5.7 | 6.0 | 6.2 | 6.1 | 5.6 |

In order not to study single solubility and magnetic field dependency of the aforementioned calcium carbonate and silicic acid, but to investigate interaction of both of them, city water containing these components was measured to obtain an adhered weight of scale in accordance with variation of magnetic flux density under the aforementioned same condition.

As shown in TABLE 2, the adhered weight of scale was maximum around 5000 Gs., subsequently it decreased with an increase of magnetic flux density, it became ⅓ of the maximum value around 12000 Gs. and it exhibited the minimum value around 13500 Gs.

Afterwards, it showed an increasing tendency and almost the same adhered weight of scale around 15000 Gs. as that obtained at 12000 Gs. Even if the magnetic flux density was increased with an improved device, efficient effect could not be obtained.

As a result, when calcium carbonate and silicic acid coexisted, the adhered weight of scale was theoretically decreased with an increase of magnetic flux density until around 10000 Gs. It has been found, however, that when magnetic flux density exceeded 10000 Gs., there exists an especially minimum value around 13500 Gs. and the adhered weight of scale could be critically decreased to ⅓ of the maximum value within a range between 12000–15000 Gs.

TABLE 2

Relationship between the adhered weight of scale and magnetic flux density

| magnetic flux density (Gs) | 5000 | 8000 | 10000 | 11000 | 12000 | 13000 | 13500 | 14000 | 15000 |
|---|---|---|---|---|---|---|---|---|---|
| scale in (mg) water | 7.0 | 5.7 | 4.0 | 2.9 | 1.6 | 0.4 | 0.2 | 0.3 | 1.2 |

In view of the foregoing experiments, it is the primary object of this invention to provide a method of preventing production and adhesion of scales in city water or in circulating industrial water containing both calcium carbonate and silicic acid as the main components, by applying an electric field having a magnetic flux density within a range between 12000–15000 Gs.

It should be noted that production of the electric field is related to the strength of magnetic field and a speed of the passing water so that the flow at the slow speed is not effective, but it should be passed at a speed more than 0.5 m/sec.

Referring to the critical range of the magnetic flux density between 12000–15000 Gs, calcium carbonate is converted into calcium ion $Ca^{2+}$ and carbonic ion $CO_3^{2-}$ in aqueous solution, and when the magnetic flux density of the magnetic field is increased, water containing ions is passed through the high magnetic flux density to produce a stronger electric field and also to decrease the adhered weight of scales comparatively.

On the other hand, when the magnetic flux density is increased, silicic acid having silicic ion $SiO_3^{2-}$ can be decreased to a certain minimum value, but then it passes the minimum value so that it can be concluded that strength of the electric field is not proportional to the adhered weight of the scales. It is considered that influence of the electric field is different for the kind of ions thus passing therethrough, thus bringing forth a critical range.

In order to investigate the aforementioned critical range, the relationship between mole ratio of Si/Ca in the scale and the magnetic flux density in the coexisting calcium carbonate and silicic acid has been obtained. Its result is shown in TABLE 3. It can be seen from this table that when the magnetic flux density is increased gradually from 8000 Gs., the mole ratio of Si/Ca increases in proportion thereto, and an inflection point is seen around 12000 Gs.

Even if the magnetic flux density is increased more than that value, increase of mole ratio of Si/Ca cannot be observed at all. It is considered that when silicic ion is activated by the magnetic field, silicic acids in the scales combine with each other so that they lose not only their chemical bonds with other substances, but also they are converted into a higher type of substances, thus forming a big obstacle disturbing the approach to ionization of scales.

To this end, the increased ratio of silicic acid ion is exhibited to prevent generation of scales, and even if the scales are adhered, they can be easily peeled off.

It can be understood from the TABLE 3 that chemical bonds of silicic acid are left until 12000 Gs., but even if the magnetic flux density is increased to more than that 15000 Gs., its effect cannot be expected. This tendency can be supported from the adhered weight of scale of silicic acid shown in TABLE 1.

TABLE 3

Relationship between mole ratio of Si/Ca in scale and magnetic flux density

| magnetic flux density (Gs) | 5000 | 8000 | 10000 | 11000 | 12000 | 13000 | 13500 | 14000 | 15000 |
|---|---|---|---|---|---|---|---|---|---|
| mole ratio of Si/Ca | 7.0 | 5.7 | 4.0 | 2.9 | 1.6 | 0.4 | 0.2 | 0.3 | 1.2 |

It is considered that when calcium carbonate and silicic acid coexist, their ions react with each other, and when calcium carbonate $Ca^{2+}$ ions and $CO_3^{2-}$ ions meet silicic acid ions $SiO_3^{2-}$ after $Ca^{2+}$ ions of calcium carbonate and $CO_3^{2-}$ ion have been formed, they are converted into a salt of calcium silicate, thus producing undissoluble scale in water. As shown in TABLE 2, its optimum value is within a range between 12000–15000 Gs.

EXAMPLES

EXAMPLE 1

Water in a pit of a cooling tower was circulated at a flow speed of 11 liter/min. for about 100 hours while applying an electric field with a magnetic flux density within a range between 12000–15000 Gs. A weight of scale adhered to a heat exchanger was measured, the result of which is shown in TABLE 4.

As shown in TABLE 4, the adhered weight of scale was decreased to the minimum value of 3% in comparison to a non-treated example around 13500 Gs, and its adhering ratio was decreased to less than 6%.

TABLE 4

Relationship between adhered weight of scale in a cooling tower and magnetic flux density

| magnetic flux density (Gs) | 8000 | 10000 | 12000 | 13500 | 14000 | 15000 |
|---|---|---|---|---|---|---|
| adhered ratio of scale | 23% | 10% | 4% | 3% | 5% | 6% |

EXAMPLE 2

Ground water treated by an applied electric field having a magnetic flux density of 13000 Gs. was used to run a boiler under the pressure of 7 kgf/cm for 50 hours, after which the necessary portions of the boiler were checked to observe only a small amount of mild scale. Such mild scale could have been easily removed.

On the other hand, when non-treated ground water was used to run the boiler, extremely solid scale has been observed around the entire inner peripheries of the pipings of the boiler.

A part of the analytical result using raw water, non-treated boiler water and magnetically treated boiler water is shown in Table 5.

TABLE 5

Effect Of Boiler Water Treated Magnetically

| | | boiler water | |
|---|---|---|---|
| kind of water | raw water | untreated | magnetically treated |
| total hardness (mg/l) | 70 | 0 | 400 |
| ion of chloride (mg/l) | 8 | 32 | 96 |
| silicic acid | 31 | 110 | 240 |

As can be understood from TABLE 5, the hard composition in the non-treated boiler water is about 250 (mg/liter) when calculated from a condensating multiplication of a silicic acid as a standard.

The hard composition of a measured value is less than the measured value, the result of which shows that most of the hard composition in boiler water has been adhered to the entire inner peripheries of the pipings of the boiler. The boiler water treated magnetically has an extraordinary effect of preventing adhesion of scale around the required peripheries of the pipings.

Generation of a magnetic field is related to the velocity of water passing through the magnetic field. A slow velocity is not effective for preventing adhesion of scales, but high speed of passing water through a pipe is effective.

According to the experiment of the inventors, the relationship between water speed and electromotive force shown in the following TABLE 6 is obtained.

It has been found that the higher the water speed is, the bigger the electromotive force becomes, and the electromotive force changes from minus to plus at a water speed of 1.5 m/sec. The most effective electromotive force is at a water speed over 2 m/sec.

TABLE 6

Relationship Between Water Speed And Electromotive Force

| water speed | 0 | 1.5 | 2 | 4 | 6 | 8 (m/sec.) |
|---|---|---|---|---|---|---|
| electromotive force | −30 | 0 | 3 | 33 | 62 | 85 (mV) |

Condition: Magnetic field having a magnetic flux density of 13000 Gs is applied into a vinyl chloride pipe having a diameter of ⅜ inch, through which industrial water containing calcium carbonate of 200 ppm and calcium silicate of 50 ppm is circulated, and the electromagnetic force at each velocity is calculated.

As fully explained in the foregoing, the present invention can provide a new and improved method of preventing production of scale and also of decreasing remarkably possibly adhered scale around inner peripheries of the pipings of a boiler.

While the forms of the invention herein described constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method of preventing adhesion of scales in industrial water containing calcium carbonate and silicic acid as the main undissoluble substances, which comprises:

a step of providing industrial water containing calcium carbonate and silicic acid as the main undissoluble substances;

a step of circulating the water at a velocity of more than 0.5 m/sec through a pipe;

and a step of applying a magnetic field having a magnetic flux density of 12000–15000 Gs to the circulating water.

2. The method as claimed in claim 1, wherein the magnetic field has a magnetic flux density of 13500 Gs.

3. The method as claimed in claim 1, wherein the industrial water contains more than 200 ppm of the calcium carbonate and more than 50 ppm of the silicic acid.

* * * * *